UNITED STATES PATENT OFFICE.

THOMAS J. MAYALL, OF READING, ASSIGNOR TO THE BRUNSWICK ANTIMONY COMPANY, OF BOSTON, MASSACHUSETTS.

FLUID CEMENT.

SPECIFICATION forming part of Letters Patent No. 286,040, dated October 2, 1883.

Application filed March 19, 1883. (No specimens.)

*To all whom it may concern:*

Be it known that I, THOMAS J. MAYALL, of Reading, in the county of Middlesex and Commonwealth of Massachusetts, have invented a new and useful Improvement in Fluid Cement, which I call "Mayall's Cement," of which the following is a specification.

My invention relates to that kind of cement which is made of gum dissolved and held in solution for use, the object of it being to produce a stronger and more reliable and durable fluid cement than has been heretofore known; and it consists in the making a solution of the substances herein mentioned in the manner described.

Heretofore liquid cement has been made of rubber or of gutta-percha or of both together dissolved in naphtha or other similar solvents, and such cement has required curing by sun-heat or artificial heat to make it durable and reliable.

To make my improved cement, I grind together in the ordinary way of compounding rubber, in the proportions of eight pounds of rubber to from four to eight pounds of the golden sulphuret of antimony (which should be in the form of an impalpable powder) and from one-quarter of a pound to two pounds of gum-shellac or other suitable gum of similar qualities, and run the compound out into sheets, which will be as formed on the roll about one-eighth of an inch to one-quarter of an inch thick. Of this sheet I cut off pieces of about a square foot and put them while hot into a bath of naphtha, one after another, until the whole batch is so put in. The bath of naphtha, for the quantities of rubber, sulphuret of antimony, and gum above mentioned, will consist of about eight gallons in a suitable vessel or tank having twelve to fifteen gallons capacity. When the rubber compound described is all in the naphtha, the tank is closed with a tight-fitting cover and left until the rubber and gum are completely dissolved, being often stirred or otherwise agitated and kept moderately warm. The process of dissolving will require more or less time, according to circumstances, as if stirred or shaken up frequently or continuously a period of six hours may be sufficient, or it may otherwise vary from that up to forty-eight hours, if there is little or no stirring done. When the gums are completely dissolved and the sulphuret of antimony equally distributed in and incorporate with the mass of liquid solution, it is ready for use, and if the uses for which the cement is desired require but little of the gum, it may be reduced to any suitable degree by adding more naphtha and thoroughly stirring until the whole is uniform in thickness.

My cement, made as described, has much greater tenacity and durability and costs less than cement heretofore made, and does not require curing by heat to make it durable and reliable.

I claim as new and my invention—

1. The above-described improved liquid cement, consisting of rubber, gum-shellac, golden sulphuret of antimony, and naphtha, combined in the manner and proportions substantially as described.

2. The above-described process of making liquid cement, consisting of compounding rubber, golden sulphuret of antimony, and gum-shellac in a rubber-grinding mill, and then dissolving the gums in a bath of naphtha, substantially as set forth.

THOS. J. MAYALL.

Witnesses:
CHS. HOUGHTON,
J. F. PICKERING.